(12) United States Patent
Heath, III et al.

(10) Patent No.: US 11,478,958 B2
(45) Date of Patent: Oct. 25, 2022

(54) MULTI-COMPONENT MANDREL FOR PROCESSING A COMPOSITE PART AND METHOD FOR FABRICATING A COMPOSITE PART

(71) Applicant: The Boeing Company, Chicago, IL (US)

(72) Inventors: Richard E. Heath, III, Chicago, IL (US); Richard A. Prause, Chicago, IL (US)

(73) Assignee: The Boeing Company, Chicago, IL (US)

( * ) Notice: Subject to any disclaimer, the term of this patent is extended or adjusted under 35 U.S.C. 154(b) by 280 days.

(21) Appl. No.: 16/163,763

(22) Filed: Oct. 18, 2018

(65) Prior Publication Data

US 2020/0122362 A1 Apr. 23, 2020

(51) Int. Cl.
*B29C 33/50* (2006.01)
*B29C 70/44* (2006.01)
(Continued)

(52) U.S. Cl.
CPC .......... *B29C 33/505* (2013.01); *B29C 33/405* (2013.01); *B29C 33/76* (2013.01);
(Continued)

(58) Field of Classification Search
CPC ... B29C 33/505; B29C 33/405; B29C 70/446; B29C 33/76; B29C 33/485; B29C 70/44;
(Continued)

(56) References Cited

U.S. PATENT DOCUMENTS

| 4,525,228 | A | * | 6/1985 | Bowen | B29C 53/821 |
| | | | | | 156/173 |
| 5,817,269 | A | * | 10/1998 | Younie | B29D 99/0003 |
| | | | | | 264/258 |

(Continued)

OTHER PUBLICATIONS

Parker Hannafin. Coefficient of Thermal Expansion. Dec. 1, 2017. <http://promo.parker.com/promotionsite/oring-ehandbook/us/en/ehome/Coefficient-of-Thermal-Expansion> (Year: 2017).*

(Continued)

*Primary Examiner* — Leith S Shafi
(74) *Attorney, Agent, or Firm* — McDonnell Boehnen Hulbert & Berghoff LLP (57) ABSTRACT

An example mandrel for processing a part is described including an inner core having a material with first thermal properties, and an outer layer surrounding the inner core. The outer layer includes a material with second thermal properties different than the first thermal properties to enable uniform pressure distribution within the mandrel. An example method for fabricating a composite part is described including placing a base composite layer into a cavity of a tooling surface, inserting a mandrel into the cavity, applying a skin to the mandrel and the base composite layer forming a package, enclosing the package in a vacuum bag and curing the base composite layer and the skin such that during curing a pressure due to thermal expansion of one of the inner core and the outer layer is distributed by the other, and removing the mandrel from the cavity of the tooling surface following the curing.

20 Claims, 4 Drawing Sheets

(51) Int. Cl.
  B29L 31/30 (2006.01)
  B29C 33/40 (2006.01)
  B29C 33/76 (2006.01)
  B29C 33/48 (2006.01)
  B29L 31/00 (2006.01)

(52) U.S. Cl.
  CPC .......... B29C 70/446 (2013.01); B29C 33/485 (2013.01); B29L 2031/3076 (2013.01); B29L 2031/757 (2013.01)

(58) Field of Classification Search
  CPC ....... B29L 2031/3076; B29L 2031/757; B29L 2031/3079; B29L 2031/3082; B29L 2031/3085; B29L 2031/3088; B29L 2031/3091; B29L 2031/3094; B29L 2031/3097; B29K 2995/0012
  See application file for complete search history.

(56) References Cited

U.S. PATENT DOCUMENTS

| | | |
|---|---|---|
| 6,325,958 B1 | 12/2001 | Lombardi et al. |
| 6,458,309 B1* | 10/2002 | Allen .................... B29C 70/446 264/319 |
| 7,293,737 B2 | 11/2007 | Engwal et al. |
| 7,357,166 B2 | 4/2008 | Pham et al. |
| 8,534,339 B2 | 9/2013 | Pham et al. |
| 9,238,335 B2 | 1/2016 | Robins et al. |
| 9,327,467 B2 | 5/2016 | Robins et al. |
| 9,486,943 B1 | 11/2016 | Robins |
| 2003/0034588 A1* | 2/2003 | Miura ..................... B29C 43/10 264/258 |
| 2010/0009124 A1* | 1/2010 | Robins ................... B29C 70/44 428/156 |
| 2015/0183139 A1* | 7/2015 | Takano ................... B29C 43/10 264/219 |
| 2016/0243730 A1 | 8/2016 | Robins et al. |
| 2018/0162074 A1* | 6/2018 | Takano ................. B29C 70/446 |

OTHER PUBLICATIONS

Azo Materials. Silicone Rubber. Jul. 10, 2017. <https://www.azom.com/properties.aspx?ArticleID=920> (Year: 2017).*

KB Roller Tech Kopierwalzen GmbH. Fluoro-elastomers (FPM, FKM). 2016. <https://www.kbrt.de/en/applications/fluoro-elastomers-fpm-fkm/> (Year: 2016).*

MatWeb. DuPont Performance Polymers VTR GLT Peroxide Cured Fluoroelastomer (FKM) Formulation <http://www.matweb.com/search/DataSheet.aspx?MatGUID=5733a0c998b24a91a6cb132d3b672826>.*

Microspheres: Fillers Filled with Possibilities : Composites World, retrieved from https://www.compositesworld.com/articles/microspheres-fillers-filled-with-possibilities on Aug. 17, 2018.

Expanel Microspheres—a Technical Presentation, AkzoNobel, 2012.

* cited by examiner

MULTI-COMPONENT MANDREL FOR PROCESSING A COMPOSITE PART AND METHOD FOR FABRICATING A COMPOSITE PART

FIELD

The present disclosure generally relates to methods and equipment for fabricating composite parts, and more particularly to, a mandrel tool used in curing composite parts that includes multiple portions each composed of a different material that has different thermal properties to enable uniform pressure distribution within the mandrel.

BACKGROUND

Mandrels may be used to layup, compress and/or cure a variety of parts that may possess one or more curves, contours, or surface features to which the mandrel needs to conform. For example, in the aircraft industry, stringers or stiffeners used in a fuselage or wings may be required to conform to composite skins that may be contoured and/or have surface features such as localized ply pad-ups or drop-offs. Thus, tooling to create these shapes can be complex due to the requirements of the structured.

In a specific example, to co-cure or co-bond the stiffener, such as a hat or omega stringer, to the skin as mentioned above, the mandrel tool is placed inside a cavity of the stiffener, and usually is caused to expand to consolidate the composite during cure to generate an appropriate pressure on the composite. Then, for the mandrel to be extracted, the mandrel contracts after cure to a smaller shape to provide clearance for extraction.

In the past, mandrels have been formed from flexible materials that allow the mandrel surface to conform to part contours. However, solid mandrels may not provide uniform pressure, in the cross-section or along the length of the part, during curing. Other mandrels, such as vented tool (bladders) can leak during curing or may not apply consistent pressure during cure, which can create variations in stringer thickness in cross-section and along length.

Accordingly, there is a need for a lightweight, flexible mandrel that readily conforms to local part contours and which may be easily handled and removed after cure without need for special equipment. There is also a need for a lightweight flexible mandrel that is easily fabricated at low cost, is durable, and produces smooth part surface finishes.

SUMMARY

In one example, a mandrel for processing a part is described comprising an inner core comprising a material with first thermal properties, and an outer layer surrounding the inner core, wherein the outer layer comprises a material with second thermal properties different than the first thermal properties to enable uniform pressure distribution within the mandrel.

In another example, a mandrel for processing a part is described comprising an inner core and an outer layer of elastomeric materials. Respective elastomeric materials of the inner core and the outer layer have dissimilar thermal properties. The inner core and the outer layer are nested cross-sectionally such that a pressure due to thermal expansion of one of the inner core and the outer layer is distributed by the other of the inner core and the outer layer.

In another example, a method for fabricating a composite part is described. The method comprises placing a base composite layer into a cavity of a tooling surface, and inserting a mandrel into the cavity of the tooling surface such that the base composite layer is between the mandrel and the tooling surface. The mandrel comprises an inner core comprising a material with first thermal properties and an outer layer surrounding the inner core. The outer layer comprises a material with second thermal properties different than the first thermal properties to enable uniform pressure distribution within the mandrel. The method also comprises applying a skin to the mandrel and the base composite layer forming a package, enclosing the package in a vacuum bag and curing the base composite layer and the skin. During curing, a pressure due to thermal expansion of one of the inner core and the outer layer is distributed by the other of the inner core and the outer layer. The method also includes removing the mandrel from the cavity of the tooling surface following the curing.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples described herein, an apparatus and method for forming hollow composite components is described. The apparatus comprise an internal mandrel with a first, outer layer with specific thermal and mechanical properties, and a second, inner core with thermal and mechanical properties different from those of the first layer. The mandrel is thus a multipart mandrel, which may comprise rubber materials with dissimilar thermal and mechanical properties (such as coefficient of thermal expansion (CTE)). By selecting a combination of properties, different materials can be used for the different layers of the mandrel having those properties, and the mandrel will enable a higher quality composite component to be created.

Existing internal rubber mandrels for fabrication of closed structure (hollow) composite parts may not apply a consistent pressure during cure to the composite part, which can create variations in thickness in cross section and along length of the composite part. During cure, some existing mandrels expand or contract inconsistently due in part to coefficient of thermal expansion (CTE) effects and geometric constraints, and thus, do not provide a uniform pressure to the composite part if the mandrel is not shaped and configured to an appropriate density. The mandrel may expand more in thicker areas than in thinner areas, or in instances in which the mandrel includes large holes providing internal voids for compression, such mandrels are difficult to handle and may not allow for tailoring of properties. Non-uniform expansion of a mandrel during cure causes bulging or problems with composite material around the mandrel.

The example mandrel described herein thus includes multiple components in the mandrel, each with different physical/thermal properties, to provide an even pressure distribution for the composite part. Utilizing different mechanical or thermal properties within each component creates a mandrel that can provide uniform or desired pressure distribution. The mandrel can be manufactured with a simplified design and manufacturing process as compared to existing mandrels with engineered axial holes.

Example mandrels described herein can provide consistent and uniform pressure for curing of composite stiffeners in inline mode line (IML) tooling applied across a non-uniform cross section of the part, which improves existing part fabrication processes. For example, when using mandrels for curing of hat stiffeners in IML, tooling, pressure exerted by thermal expansion of the mandrel needs to be uniformly distributed regardless of the shape of the mandrel. If pressure is not evenly distributed, the resulting composite part will have unacceptable thickness variations (consolidation) that result from too much pressure in some areas and not enough pressure in other areas. Using the mandrel described herein, a unique geometry can be chosen for the mandrel as required by the composite part being fabricated, and pressure can be distributed due to the mandrel comprising multiple components.

The mandrel can help to maintain the composite part at the substantially same size or same configuration at room temperature as well as in an autoclave at elevated temperature/pressure for an outside mode line (OML) part (e.g., so that part fibers are not distorted—bulging walls, radius growth, noodle shifting, etc.).

Figure 1:
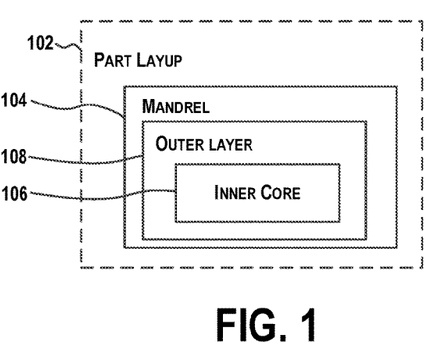
FIG. 1 illustrates a mandrel used for processing a part, such as to form and/or cure a part layup, according to an example implementation.

Referring now to FIG. 1, a mandrel 104 may be used for processing a part, such as to form and/or cure a part layup 102 comprising multiple plies (not shown) of fiber reinforced polymer resin. For example, multiple plies of fiber reinforced polymer plies are laid up over the mandrel 104 in order to form the plies into a desired part shape. The part layup 102 may partially or fully surround the mandrel 104, such that the mandrel 104 is at least substantially enclosed by the part layup 102.

Figure 11:
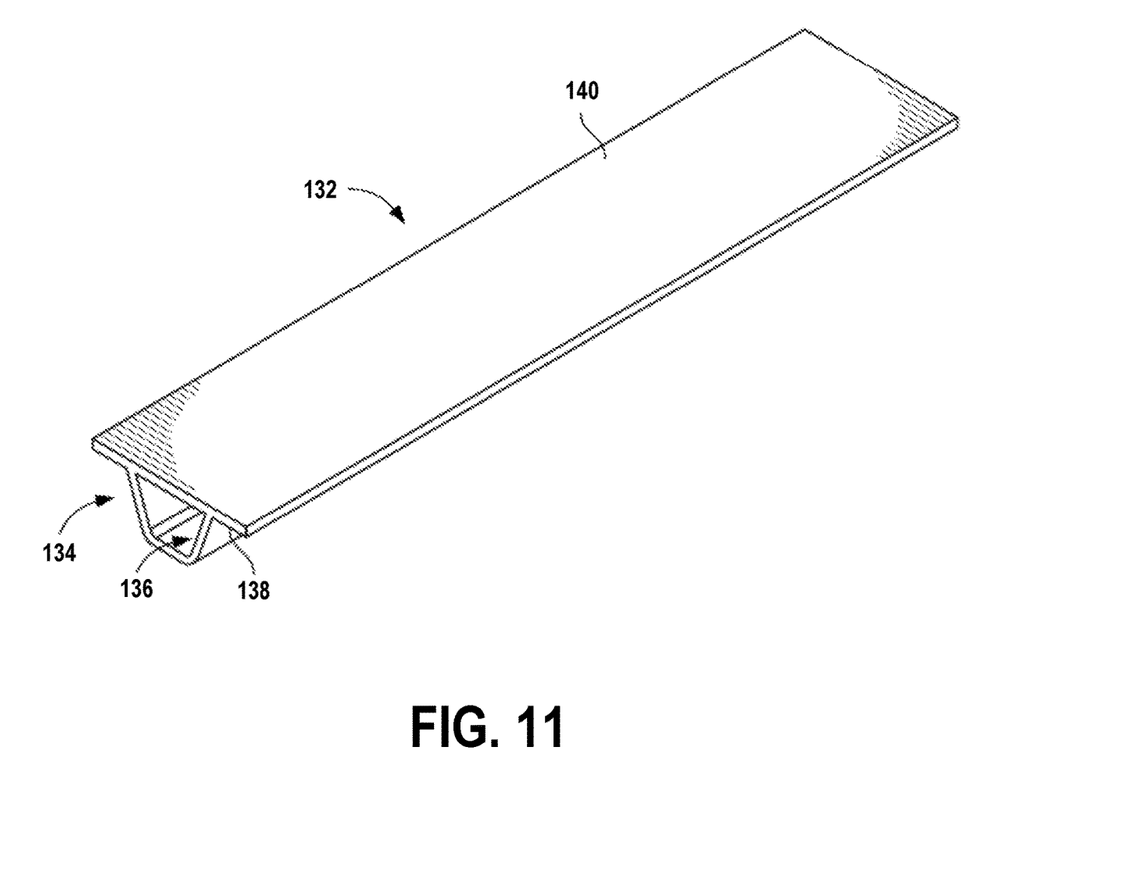
FIG. 11 illustrates an example stringer having an internal cavity by which the mandrel may be used for fabrication, according to an example implementation.

The part layup 102 may be cured to form any of a variety of composite components, structures, or parts that form full or partial enclosures having uniform or non-uniform cross sections along their lengths. For example, the cured part may comprise an integrally stiffened skin. As another example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the mandrel 104 to form the part layup 102 is illustrated in FIG. 11 (described below).

The mandrel 104 includes an inner core 106 comprising a material with first thermal properties, and an outer layer 108 surrounding the inner core 106. The outer layer 108 comprises a material with second thermal properties different than the first thermal properties to enable uniform pressure distribution within the mandrel 104.

Each of the inner core 106 and the outer layer 108 can be a solid component, which provides a strong structure upon which the part layup 102 is provided. Thus, the inner core 106 and the outer layer 108 may not include holes or openings. The inner core 106 may comprise 75% of the mandrel 104 and the outer layer 108 may comprise 25% of the mandrel 104. Other ratios of the inner core 106 and the outer layer 108 may be used as well depending on materials chosen for each, and desired properties of the mandrel 104. Using the 75%/25% composition noted above provides an advantage of being simple to identify and fabricate the mandrel 104 with correct CTE generated pressure distributions.

The materials of the inner core 106 and the outer layer 108 may be composed of an elastomeric material. The elastomeric material may include various materials, and the thus, the inner core 106 and the outer layer 108 may be formed from, for example, without limitation, a rubber material, a composite material, a silicone material, and other combinations of materials. The elastomeric material may also include materials such as Teflon® (E.I. du Pont de Nemours and Company) coated silicone or hard rubber, and may be pliable to enable the elastomeric material to conform to various configurations. The elastomeric material may also include Viton™ or butyl rubber, as additional examples.

Each of the inner core 106 and the outer layer 108 thus includes a flexible housing forming an enclosure that may increase or decrease in volume when the mandrel 104 is subjected to a change in a processing environment, such as to expand during a curing process of the part layup 102 to consolidate the composite laminate and generate an appropriate pressure on the laminate (e.g., to react to autoclave conditions or changing pressure and provide internal compaction). Then, for the mandrel 104 to be extracted, it will contract down after cure to a smaller size to provide clearance for extraction and to be withdrawn from the part layup 102 either after the part layup 102 is compacted and/or cured.

Within examples, the change in the processing environment includes a change in temperature (e.g., the cure temperature of the composite component), and thus, one of or both of the inner core 106 and the outer layer 108 deform based on a threshold temperature applied to the mandrel 104 to enable uniform pressure distribution within the mandrel 104. An example threshold temperature may be within a range of about 200° F. to 400° F. Other threshold temperatures may be applicable as well based on the type of elastomeric material used and the type of optionally included hollow micro-particles used, such as within a range of about 100° F. to 200° F., a range of about 150° F. to 300° F., a range of about 250° F. to 350° F., etc. Within further examples, the change in the processing environment includes a change in pressure, and thus, one of or both of the inner core 106 and the outer layer 108 deform based on a threshold pressure applied to the mandrel 104 to enable uniform pressure distribution within the mandrel 104. An example threshold pressure may be within a range of about 100-200 psi.

As described, the inner core 106 includes a material with first thermal properties, and the outer layer 108 includes a material with second thermal properties different than the first thermal properties to enable uniform pressure distribution within the mandrel 104. In one example, the first thermal properties and the second thermal properties include a coefficient of thermal expansion (CTE). For instance, the material of the outer layer 108 may include a CTE lower than a CTE of the material of the inner core 106 to enable the inner core 106 to expand and compress the outer layer 108 for distribution of pressure. Alternatively, the material of the inner core 106 may include a CTE lower than a CTE of the material of the outer layer 108 to enable the outer layer 108 to expand and compress the inner core 106 for distribution of pressure.

In an example, the material of the inner core 106 can include one of silicon or fluoropolymer elastomer, and the material of the outer layer 108 can include the other of the silicon or fluoropolymer elastomer. Thus, the inner core 106 can include silicon and outer layer 108 can include fluoropolymer elastomer, or the inner core 106 can include fluoropolymer elastomer and outer layer 108 can include silicon.

In one example, silicone rubber with a thermal expansion of $30 \times 10^{-5}$ cm/cm/C can be used for the inner core 106 and Viton™ rubber with a thermal expansion of 16 cm/cm/C can be used for the outer layer 108. A percentage of each component can be adjusted to achieve desired pressure exerted by thermal expansion without creating a custom material that would be required if a single component is used.

In another example, the inner core 106 includes the material with first mechanical properties, and the outer layer 108 includes the material with second mechanical properties different from the first mechanical properties. Fabricating the mandrel 104 with multiple components and each having different mechanical properties can also help to enable uniform pressure distribution within the mandrel 104. In one example, the first mechanical properties and the second mechanical properties include density. In another example, the first mechanical properties and the second mechanical properties include stiffness.

For example, the material of the outer layer 108 may include a less dense material than the material of the inner core 106 to enable the inner core 106 to expand and compress the outer layer 108 for distribution of pressure. Alternatively, the material of the inner core 106 may include a less dense material than the material of the outer layer 108 to enable the outer layer 108 to expand and compress the inner core 106 for distribution of pressure.

To create materials for use in the inner core 106 and the outer layer 108 having different mechanical properties (such as different densities), in one example hollow micro-particles can be embedded within the materials that are used for the inner core 106 and the outer layer 108. A different distribution of hollow-microparticles can be used for the material of the inner core 106 versus the material of the outer layer 108 to create materials having different densities, and thus, different mechanical properties.

For example, a distribution of hollow micro-particles embedded within the inner core 106 can be selected such that there results in a distribution of voids being, for example, about 10% to about 30% void area in the inner core 106 following creation of the micro-voids. Then, a different distribution of hollow micro-particles can be selected to be embedded in the outer layer 108 such that there results in a different distribution of voids being created. Density values of voids in the inner core 106 and the outer layer 108 can be selected such as between about 5% to 10% void area, 10% to 20% void area, 15% to 25% void area, 25% to 40% void area, etc. An amount of void area in the inner core 106 and the outer layer 108 is based on an amount of the hollow micro-particles embedded within the inner core 106 and the outer layer 108, and the amount of void area is related to a desired compression of the inner core 106 and the outer layer 108. In some examples, one of inner core 106 and the outer layer 108 may include embedded hollow micro-particles, and the other of the inner core 106 and the outer layer 108 may not, such that there results in a difference in distribution of hollow micro-particles between the inner core 106 and the outer layer 108.

The hollow micro-particles deform in response to a change in a processing environment resulting in a distribution of voids in the materials. The voids further enable the material to be flexible and increase or decrease in volume when the mandrel 104 is subjected to the change in the processing environment. The hollow micro-particles can include polymer microspheres, or other collapsible microspheres. The polymer microspheres may include microspheres that crush under a threshold pressure resulting in the distribution of voids. The polymer microspheres may additionally or alternatively include microspheres that melt under a threshold temperature resulting in the distribution of voids. The polymer microspheres may include microspheres that melt under a threshold temperature resulting in the distribution of voids with residue of the polymer microspheres remaining.

The hollow micro-particles may range in size from about 0.1 μm to about 300 μm in diameter, and generally have a shape of a sphere. Other sizes or shapes are possible as well, such as between 1 μm to 100 μm in diameter, 10 μm to 50 μm in diameter, 100 μm to 200 μm in diameter, etc. When integrated into one or the inner core 106 and the outer layer 108, the hollow micro-particles provide a variety of enhancements and improvements including low density, improved dimensional stability, increased impact strength, smoother surface finish, greater thermal insulation, easier machinability, faster cycle times, and cost savings. The hollow micro-particles may comprise a wide variety of materials, including ceramics, plastic, glass, polymers, and metals and their properties can be tailored so that the hollow micro-particles create micro-voids within elastomer base material of the inner core 106 and/or the outer layer 108 when subjected to the change in the processing environment.

Within some examples, the inner core 106 and the outer layer 108 include an elongated mandrel body. The elongated mandrel body is useful for creating a mandrel of a size and shape as needed for a part, such as a stringer.

Figure 2:
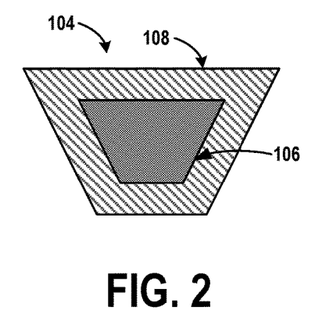
FIG. 2 illustrates an end cross-sectional view of the mandrel, according to an example implementation.

FIG. 2 illustrates an end cross-sectional view of the mandrel 104, according to an example implementation. In FIG. 2, the mandrel 104 is an upside down hat configuration to assist with former a composite stringer for an airplane. As shown in FIG. 2, the outer layer 108 surrounds the inner core 106. The outer layer 108 entirely surrounds the inner core 106 such that the inner core 106 is embedded within the outer layer 108. In another example, the inner core 106 and the outer layer 108 are nested cross-sectionally such that a pressure due to thermal expansion of one of the inner core 106 and the outer layer 108 is distributed by the other of the inner core 106 and the outer layer 108.

Thus, the outer layer 108 is coaxially positioned around the inner core 106, such that the outer layer 108 is disposed outside of the inner core 106. Each of the inner core 106 and the outer layer 108 are separate and distinct components or layers of the mandrel 104. The inner core 106 and the outer layer 108 then are interfaced together, such as by a press fit of the inner core 106 into an internal area of the outer layer 108, for example. In some examples, no adhesive is needed to interface the inner core 106 and the outer layer 108. Using cast elastomers for at least one of the inner core 106 and the outer layer 108 can create a surface to surface interface (casting one component inside of or around the other component).

After integrated together, the inner core 106 and the outer layer 108 form the mandrel 104. Once integrated, the inner core 106 and the outer layer 108 are still separate components, however.

The inner core 106 and the outer layer 108 are illustrated in FIG. 2 with different shading to illustrate that the inner core 106 and the outer layer 108 include materials that have dissimilar thermal properties, dissimilar mechanical properties, or are different materials altogether. In the example shown in FIG. 2, the inner core 106 includes a material that is softer or has a lower CTE than a material of the outer layer 108. Thus, the outer layer 108 includes a material that has a higher CTE than a material of the inner core 106. As a result, as the inner core 106 expands during curing, the outer layer 108 compresses to distribute the pressure more evenly.

Figure 3:
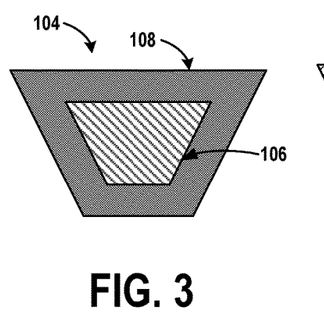
FIG. 3 illustrates an end cross-sectional view of the mandrel, according to another example implementation.

FIG. 3 illustrates an end cross-sectional view of the mandrel 104, according to another example implementation. In the example shown in FIG. 3, the outer layer 108 includes a material that is softer or has a lower CTE than a material of the inner core 106. Thus, the inner core 106 includes a material that has a higher CTE than a material of the outer layer 108. As a result, as the outer layer 108 expands during curing, the inner core 106 compresses to distribute the pressure more evenly.

Figure 4:
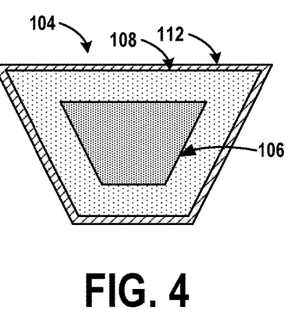
FIG. 4 illustrates an end cross-sectional view of the mandrel, according to another example implementation.

FIG. 4 illustrates an end cross-sectional view of the mandrel 104, according to another example implementation. In FIG. 4, a third layer 112 surrounds the outer layer 108 and includes a material with third thermal properties different than the thermal properties of the elastomeric materials of the inner core 106 and the outer layer 108 (e.g., different than the first thermal properties of the material of the inner core 106 and different than the second thermal properties of the material of the outer layer 108). The third layer 112 can include a material with a higher CTE or lower CTE than either or both of the inner core 106 and the outer layer 108 to provide further distribution of pressure within the mandrel 104.

In one example, the third layer 112 can be a thin layer that is used to optimize the CTE due to certain geometry of the part/mandrel. For instance, a mandrel that has a very small angle or a part that has less bulk in one area that requires less CTE from the mandrel than the other areas of the mandrel can have an additional third layer.

Thus, the example configurations shown in FIGS. 2-4 represent a dual density mandrel. In examples where the hollow micro-particles are embedded within one of the inner core 106 and the outer layer 108, the other may be a solid elastomer.

Selection of materials to use for the inner core 106 and the outer layer 108 can be made to balance stiffness and CTE effects during cure. An optimization of pressure distribution can be determined by combining two different materials through a cross-section of the mandrel 104. As mentioned above, a silicone soft layer can be selected for the outer layer 108, and a hard Viton™ material can be selected for the inner core 106 to optimize properties.

Figure 5:
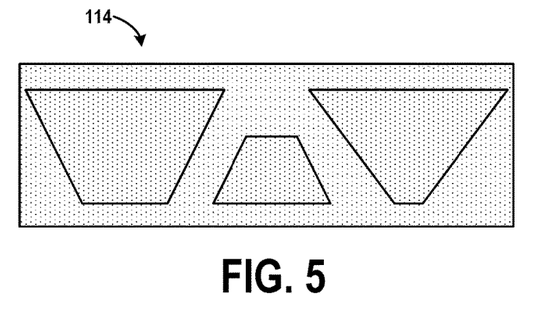
FIG. 5 illustrates a block of elastomer including embedded micro-particles, and an outline of example inner cores to cut out of the block, according to an example implementation.

FIG. 5 illustrates a block 114 of elastomer including embedded micro-particles, and an outline of example inner cores to cut out of the block 114, according to an example implementation. Outer layers may also be machined out of the block 114 by cutting a shape out and removing an internal portion, for example.

In one example, the block 114 of elastomer can be fabricated with embedded micro-particles (which can be subjected to pressure and/or temperature thresholds to create the internal micro-voids), and then custom inner core cross sections can be machined/cut out of the block. Manufacturing of the mandrel 104 may then be less expensive and may reduce non-recurring tooling costs. Manufacturing of the mandrel 104 may also be faster as compared to vented bladders, as well as provide cost avoidance from eliminating a risk of leaks associated with vented bladders.

In addition, mandrels are normally fabricated using a casting, however, the mandrel 104 described herein may be manufactured by creating inner cores or outer layers as shown in FIG. 5 without casting to make mandrels of different geometries. Again, this can help to lower manufacturing costs of the mandrel 104. Once the outer layer is created (by removing an inner portion), the inner core can be inserted into the outer layer by a manual process.

Thus, the block 114 can be fabricated by mixing the hollow micro-particles with silicon to achieve a uniform distribution of the hollow micro-particles within the silicon resulting in a silicon slurry mix, and then positioning the silicon slurry mix into a mold. The mold can be any shape, such as that of the block 114 shown in FIG. 5. Following, the mold is cured, and the inner core 106 or the outer layer 108 is cut from the mold. Also, a third or subsequent layer can further be cut from the block 114, if used for the mandrel 104, and then positioned surrounding the outer layer 108.

Different blocks having different distributions of hollow micro-particles can be created to fabricate the mandrel 104 with the outer layer 108 having a material with thermal properties different than the thermal properties of the inner core 106.

In operation for curing a composite part, the inner core 106 and/or the outer layer 108 will grows in size due to coefficient of thermal expansion (CTE) effects, which creates pressure inside a trapped volume. In an example, a 20% expansion may be experienced by the inner core 106 at 360° F., which generate 90 psi. With the outer layer 108 being compressible, this enables the outer layer 108 to accept some of the expansion of the inner core 106. In an example, a 10% compression may be experienced by the outer layer 108 at 90 psi. Compression of the outer layer 108 helps during cure of the composite part so that the mandrel 104 does not push the composite part away and cause bulging.

Figure 6:
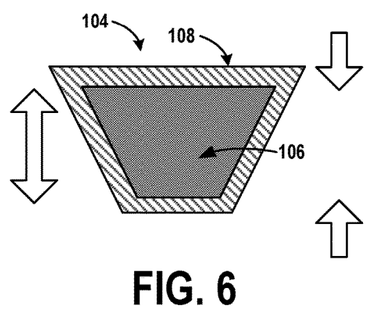
FIG. 6 illustrates an end cross-sectional view of the mandrel in operation, according to an example implementation.

FIG. 6 illustrates an end cross-sectional view of the mandrel 104 in operation, according to an example implementation. In FIG. 6, the inner core 106 includes a material with a lower CTE than a material of the outer layer 108. As shown in FIG. 6, the inner core 106 can expand and grow in size, and the outer layer 108 will then act to compress the inner core 106 during expansion to distribute the pressure evenly within the mandrel 104. In other examples, where the inner core 106 includes a material with a higher CTE than a material of the outer layer 108, the outer layer 108 can expand and grow in size, and the inner core 106 will then act to compress and accept pressure to distribute the pressure evenly within the mandrel 104.

In an example use case, the mandrel 104 may be used for curing composite hat stiffeners for an aircraft. Hat stiffeners are commonly used in composite structures, and tooling to create these shapes can be complex due to requirements of the structure. To co-cure or co-bond the hat stiffener to a skin, the mandrel 104 is placed inside a cavity of the hat stiffener. The mandrel 104 generally expands to consolidate the composite laminate during cure to generate an appropriate pressure on the laminate. Then, the mandrel 104 contracts down after cure to a smaller shape to provide clearance for extraction. The mandrel 104 is designed to control both the expansion and stiffness of the mandrel 104 through the use of different material properties used for the inner core 106 and the outer layer 108.

Thus, during cure, the mandrel 104 provides an even pressure distribution across the hat/skin cross section, and pressure generated by the mandrel 104 substantially matches external pressure of a processing environment in which the part is curing (e.g., autoclave pressure, ambient pressure, etc.). After cure, the mandrel 104 decreases in size than the hat stiffener cured geometry allowing removal.

Figure 7:
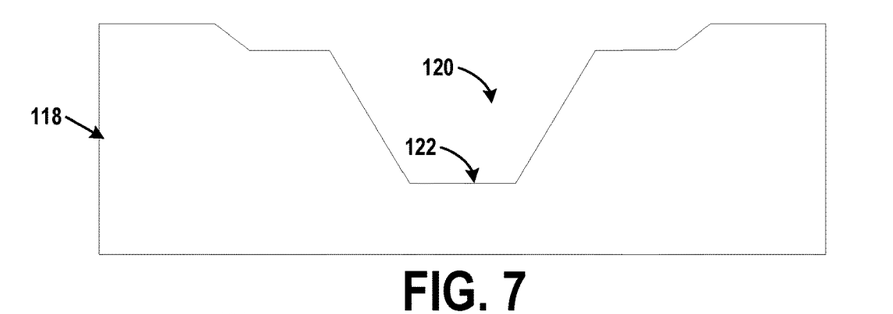
FIG. 7 illustrates an end cross-sectional view of a tool used in the fabrication of the composite part, according to an example implementation.

FIGS. 7-10 illustrate an example process flow for fabrication of a composite part, according to an example implementation. The illustrations in FIGS. 7-10 illustrate end cross-sectional views of elements used in the fabrication of the composite part. Initially, as shown in FIG. 7, a tool 118 is shown that includes a cavity 120 and a tooling surface 122. The cavity 120 is shaped and sized according to a hollow cavity as desired for the composite part.

Figure 8:
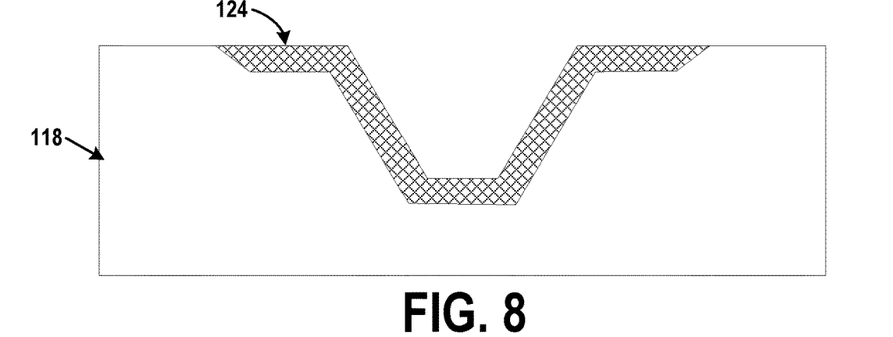
FIG. 8 illustrates an end cross-sectional view of a base composite layer placed into the cavity of the tool, according to an example implementation.
Figure 9:
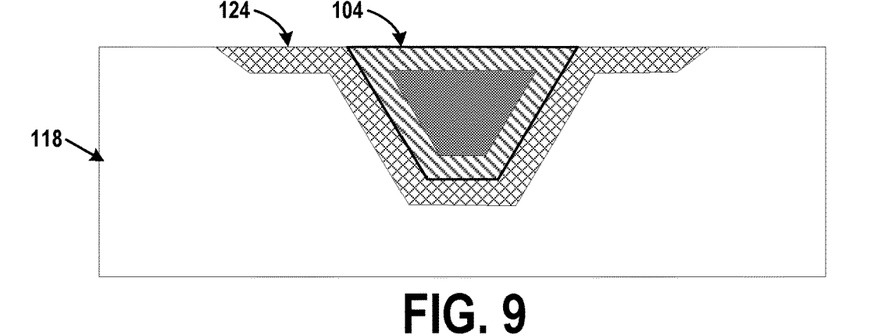
FIG. 9 illustrates an end cross-sectional view of the mandrel inserted into the cavity of the tool, according to an example implementation.

Next, as shown in FIG. 8, a base composite layer 124 is placed into the cavity 120 and onto the tooling surface 122. Following, as shown in FIG. 9, the mandrel 104 is inserted into the cavity 120 of the tooling surface 122 such that the base composite layer 124 is between the mandrel 104 and the tooling surface 122.

Figure 10:
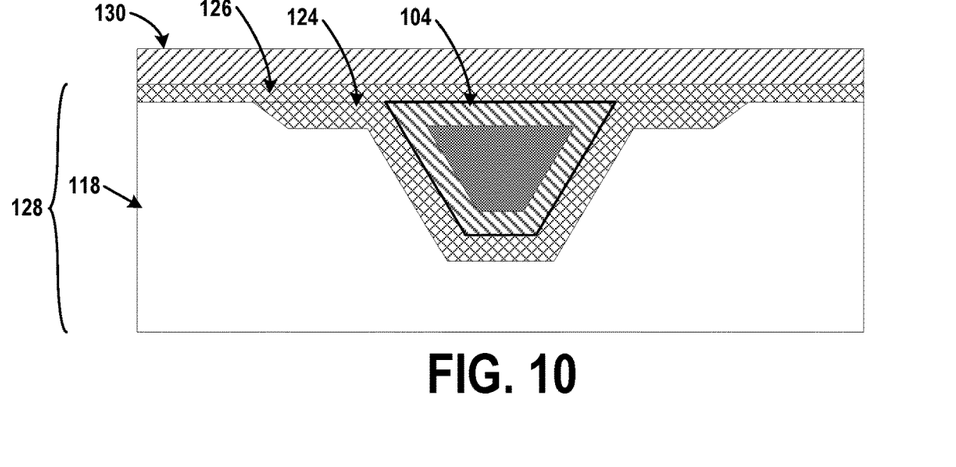
FIG. 10 illustrates an end cross-sectional view of a skin applied to the mandrel and the base composite layer forming a package, according to an example implementation.

As shown in FIG. 10, a skin 126 is applied to the mandrel 104 and the base composite layer 124 forming a package 128. Then, the package 128 is enclosed in a vacuum bag 130, and the base composite layer 124 and the skin 126 are co-cured. During curing, the inner core 106 and the outer layer 108 (and optionally third layer 112) of the mandrel 104 expand or compress differently to enable uniform pressure distribution within the mandrel 104, which allows the mandrel 104 to expand and not cause bulging of the skin 126. For example, the inner core 106 can expand into a volume of the outer layer 108 that is more compressible than the inner core 106. Following curing, the mandrel 104 is removed from the cavity 120 of the tooling surface 122.

The mandrel 104 thus applies pressure to the base composite layer 124 and the skin 126 during layup and curing so as to form a hat stiffener. The mandrel 104 defines and maintains a shape of the hat stiffener during curing, with substantially even pressure and without substantial distortion. As shown, the mandrel 104 has a substantially trapezoidal cross sectional shape, generally matching that of the hat stiffener. However, the mandrel 104 may possess any of a variety of cross sectional shapes depending on an application and a particular shape of the composite structure layup. The mandrel 104 also includes a generally solid body that extends a length of the hat stiffener.

During the thermal cycling used to effect co-curing of the base composite layer 124 and the skin 126, substantially uniform expansion of the mandrel 104 occurs, and the different thermal and/or mechanical properties of the inner core 106 and the outer layer 108 provide volume into which the expansion may occur internally within the mandrel 104.

FIG. 11 illustrates an example stringer 132 (e.g., composite resin part) having an internal cavity by which the mandrel 104 may be used for fabrication, according to an example implementation. For example, and without limitation, the mandrel 104 and curing method may be used in fabrication of a fiber reinforced composite resin stringer as shown in FIG. 11. In one arrangement, the stringer 132 may comprise a multi-ply layup of prepreg. In the illustrated arrangement, the stringer 132 comprises a hat section 134 forming an internal stringer cavity 136, a pair of laterally extending flange sections 138, and a substantially flat skin section 140 that is consolidated together with the flange sections 138 during curing. As those of ordinary skill in the art will recognize, alternative stringer geometries are possible.

The stringer 132 may be fabricated as described in FIGS. 7-10 using the mandrel 104 as shown for example in FIGS. 2-4. After curing, the part layup 102 of FIG. 1 forms the stringer 132. The mandrel 104 fills the stringer cavity 136 that is a hollow trapezoidal space.

Example composite material used for the stringer 132 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the mandrel 104 (or mold) to pre-form the tape or fabric into a desired shape of the stringer 132 as defined by the mandrel 104. The stringer 132 could be any suitable dimension to provide various degrees of reinforcement, and could comprise any number of plies of prepreg tape or fabric.

The mandrel 104 enables fabrication of high quality stringers by applying consistent internal pressure during fabrication. The mandrel 104 also enables easier extraction after cure due to increased compression abilities from the micro-voids.

In addition, the mandrel 104 is not just useful during curing of the stringer 132, but also, the mandrel 104 is consistent in size at room temperatures as well to help provide a consistent structure on which the fibers can be positioned. Small changes in temperature will not affect positioning of the fibers through use of the mandrel 104 during the assembly of the stringer (or other example part) prior to cure.

Within the examples described above, the mandrel 104 provides for improved fabrication of closed composite structures (such as hat stringers) due to the mandrel 104 formed using the inner core 106 and the outer layer 108 having different thermal and/or mechanical properties. By selecting properties of the inner core 106 and the outer layer 108 (such as degree of loading, density, size, composition, etc.), a performance of the mandrel 104 can be optimized to ensure high quality part fabrication. The mandrel 104 can also be used in other applications for fabrication of other types of composite structures.

Figure 12:
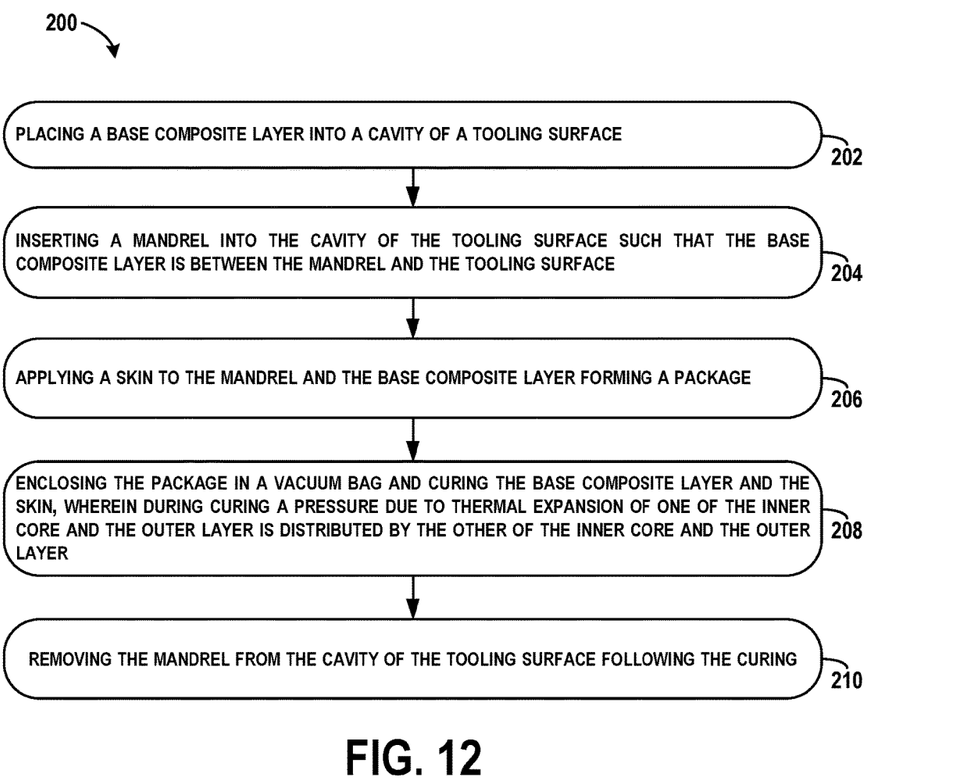
FIG. 12 shows a flowchart of an example method for fabricating a composite part, according to an example implementation.

FIG. 12 shows a flowchart of an example method 200 for fabricating a composite part (e.g., such as the stringer 132), according to an example implementation. Method 200 shown in FIG. 12 presents an example of a method that, for example, could be used with the mandrel 104 shown in FIG. 1, for example, and may be performed with components illustrated in FIG. 1. In some examples, components may be arranged to be adapted to, capable of, or suited for performing the functions, such as when operated in a specific manner. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes placing the base composite layer 124 into the cavity 120 of the tooling surface 122. At block 204, the method 200 includes inserting the mandrel 104 into the cavity 120 of the tooling surface 122 such that the base composite layer 124 is between the mandrel 104 and the tooling surface 122. At block 206, the method 200 includes applying the skin 126 to the mandrel 104 and the base composite layer 124 forming the package 128. At block 208, the method 200 includes enclosing the package 128 in the vacuum bag 130 and curing the base composite layer 124 and the skin 126. During curing a pressure due to thermal expansion of one of the inner core 106 and the outer layer 108 is distributed by the other of the inner core 106 and the outer layer 108. At block 210, the method 200 includes removing the mandrel 104 from the cavity 120 of the tooling surface 122 following the curing.

Figure 13:
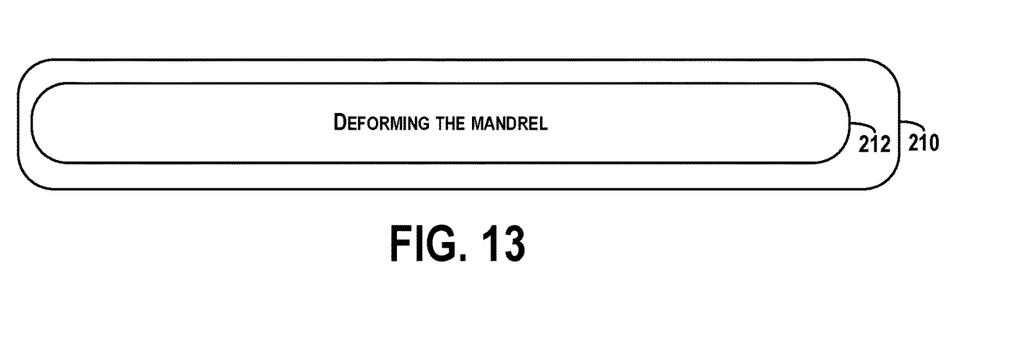
FIG. 13 shows a flowchart of an example method for removing the mandrel as shown in FIG. 12, according to an example implementation.

FIG. 13 shows a flowchart of an example method for removing the mandrel 104 as shown in block 210 of FIG. 12, according to an example implementation. At block 212, functions include deforming the mandrel 104.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), apparatus(es), and method(s) disclosed herein include a variety of components, features, and functionalities. It should be understood that the various examples of the system(s), apparatus(es), and method(s) disclosed herein may include any of the components, features, and functionalities of any of the other examples of the system(s), apparatus(es), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A mandrel for processing a part, the mandrel comprising:
   an inner core, comprising a material with first thermal properties;
   an outer layer, surrounding the inner core, wherein the outer layer and the inner core are interfaced together, causing a surface of the outer layer to interface with a surface of the inner core and be in contact with an entire periphery of the surface of the inner core, resulting in a solid mandrel with no openings present in the mandrel, and wherein the outer layer comprises a material with second thermal properties different than the first thermal properties to enable uniform pressure distribution within the mandrel, wherein the material of the inner core and the material of the outer layer are embedded with hollow micro-particles; and
   a third layer, surrounding the outer layer and comprising a material with third thermal properties different than the first thermal properties of the material of the inner core and different than the second thermal properties of the material of the outer layer.

2. The mandrel of claim 1, wherein the first thermal properties and the second thermal properties include a coefficient of thermal expansion (CTE).

3. The mandrel of claim 1, wherein:
   the material of the inner core has first mechanical properties; and
   the material of the outer layer has second mechanical properties different than the first mechanical properties.

4. The mandrel of claim 3, wherein the first mechanical properties and the second mechanical properties include density.

5. The mandrel of claim 3, wherein the first mechanical properties and the second mechanical properties include stiffness.

6. The mandrel of claim 1, wherein the material of the outer layer comprises a less dense material than the material of the inner core to enable the inner core to expand and compress the outer layer for distribution of pressure.

7. The mandrel of claim 1, wherein the material of the outer layer comprises a coefficient of thermal expansion (CTE) lower than a CTE of the material of the inner core to enable the inner core to expand and compress the outer layer for distribution of pressure.

8. The mandrel of claim 1, wherein the material of the inner core comprises a less dense material than the material of the outer layer to enable the outer layer to expand and compress the inner core for distribution of pressure.

9. The mandrel of claim 1, wherein the material of the inner core comprises a coefficient of thermal expansion (CTE) lower than a CTE of the material of the outer layer to enable the outer layer to expand and compress the inner core for distribution of pressure.

10. The mandrel of claim 1, wherein the inner core and the outer layer surrounding the inner core comprise an elongated mandrel body.

11. The mandrel of claim 1, wherein:
the material of the inner core comprises one of silicon or fluoropolymer elastomer, and
the material of the outer layer comprises the other of the silicon or the fluoropolymer elastomer.

12. A mandrel for processing a part, the mandrel comprising an inner core, comprising an elastomeric material, and an outer layer, comprising an elastomeric material, wherein:
the elastomeric material of the inner core and the elastomeric material of the outer layer have thermal properties that are dissimilar, wherein the elastomeric material of the inner core and the elastomeric material of the outer layer are embedded with hollow micro-particles,
the inner core and the outer layer are nested cross-sectionally such that a pressure due to thermal expansion of one of the inner core and the outer layer is distributed by the other of the inner core and the outer layer,
the outer layer and the inner core are interfaced together, causing a surface of the outer layer to interface with a surface of the inner core and be in contact with an entire periphery of the surface of the inner core, resulting in a solid mandrel with no openings present in the mandrel,
the mandrel further comprises a third layer, surrounding the outer layer, and
the third layer comprises a material with third thermal properties different than thermal properties of the material of the inner core and different than thermal properties of the material of the outer layer.

13. The mandrel of claim 12, wherein the elastomeric material of the inner core and the elastomeric material of the outer layer have dissimilar mechanical properties.

14. The mandrel of claim 12, wherein:
the elastomeric material of the inner core comprises a first material,
the elastomeric material of the outer layer comprises a second material,
the first material comprises silicon, and
the second material comprises fluoropolymer elastomer.

15. The mandrel of claim 12, wherein:
the elastomeric material of the inner core comprises a first material,
the elastomeric material of the outer layer comprises a second material, and
the first material has a coefficient of thermal expansion (CTE), which is lower than a CTE of the second material.

16. The mandrel of claim 12, wherein:
the elastomeric material of the inner core comprises a first material,
the elastomeric material of the outer layer comprises a second material, and
the first material has a coefficient of thermal expansion (CTE), which is higher than a CTE of the second material.

17. The mandrel of claim 1, wherein a ratio of composition of the outer layer to composition of the inner core is 1:3.

18. A mandrel for processing a part, the mandrel comprising:
an inner core, consisting of a single material with first thermal properties;
an outer layer, surrounding the inner core, wherein the outer layer and the inner core are interfaced together, causing a surface of the outer layer to interface with a surface of the inner core, resulting in a solid mandrel with no openings present in the mandrel, and wherein the outer layer comprises a material with second thermal properties different than the first thermal properties to enable uniform pressure distribution within the mandrel, wherein the single material of the inner core and the material of the outer layer are embedded with hollow micro-particles; and
a third layer, surrounding the outer layer and comprising a material with third thermal properties different than the first thermal properties of the material of the inner core and different than the second thermal properties of the material of the outer layer.

19. The mandrel of claim 18, wherein a distribution of the hollow micro-particles within the single material of the inner core is different than a distribution of the hollow micro-particles within the material of the outer layer.

20. The mandrel of claim 12, wherein a distribution of the hollow micro-particles within the elastomeric material of the inner core is different than a distribution of the hollow micro-particles within the elastomeric material of the outer layer.

* * * * *